June 22, 1943.  W. N. BAGLEY  2,322,271
IRRIGATION SPRINKLER
Filed Sept. 23, 1940  4 Sheets-Sheet 1
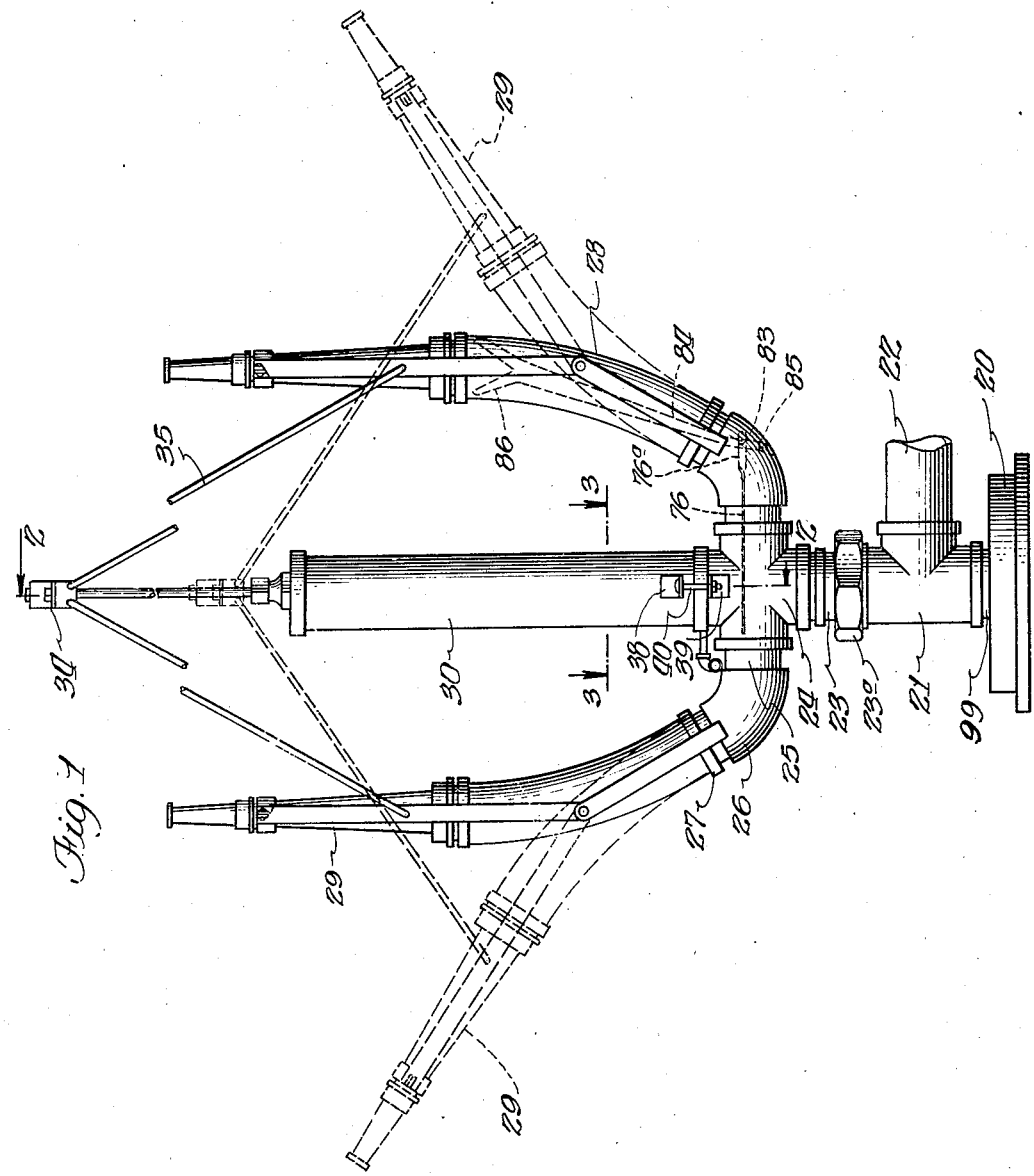
Inventor:
William N. Bagley
By: Stevens + Batcheler
Attys.

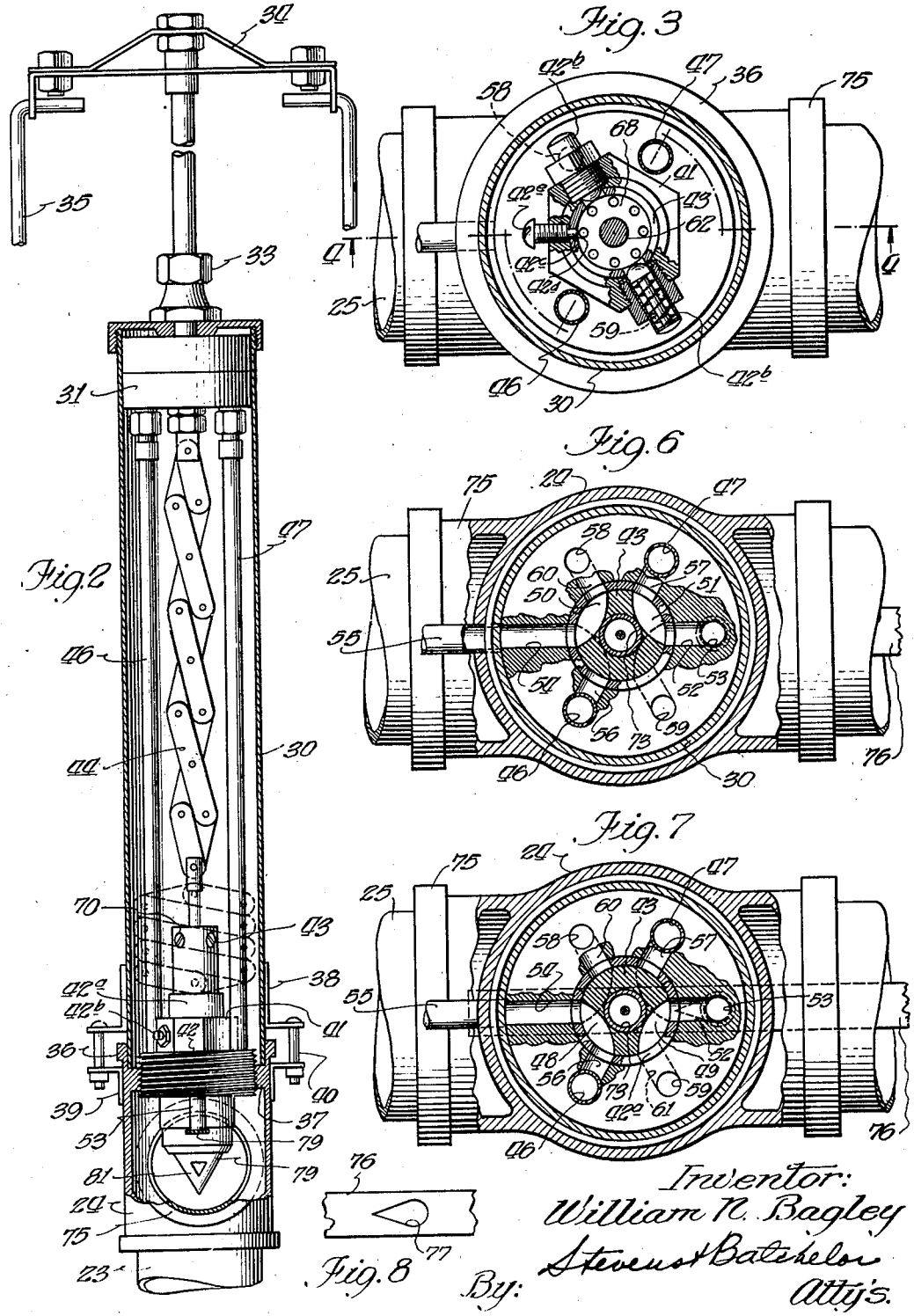

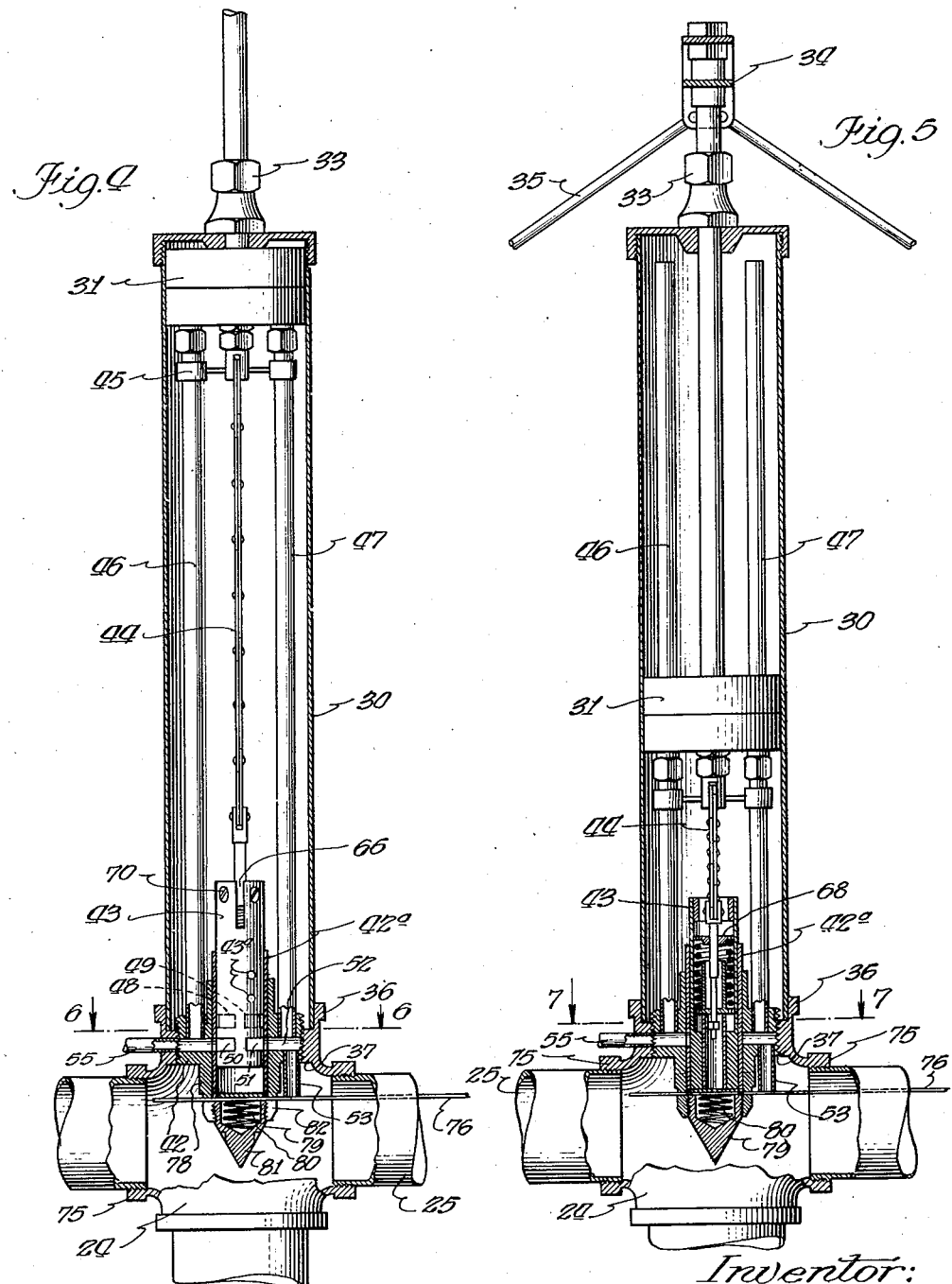

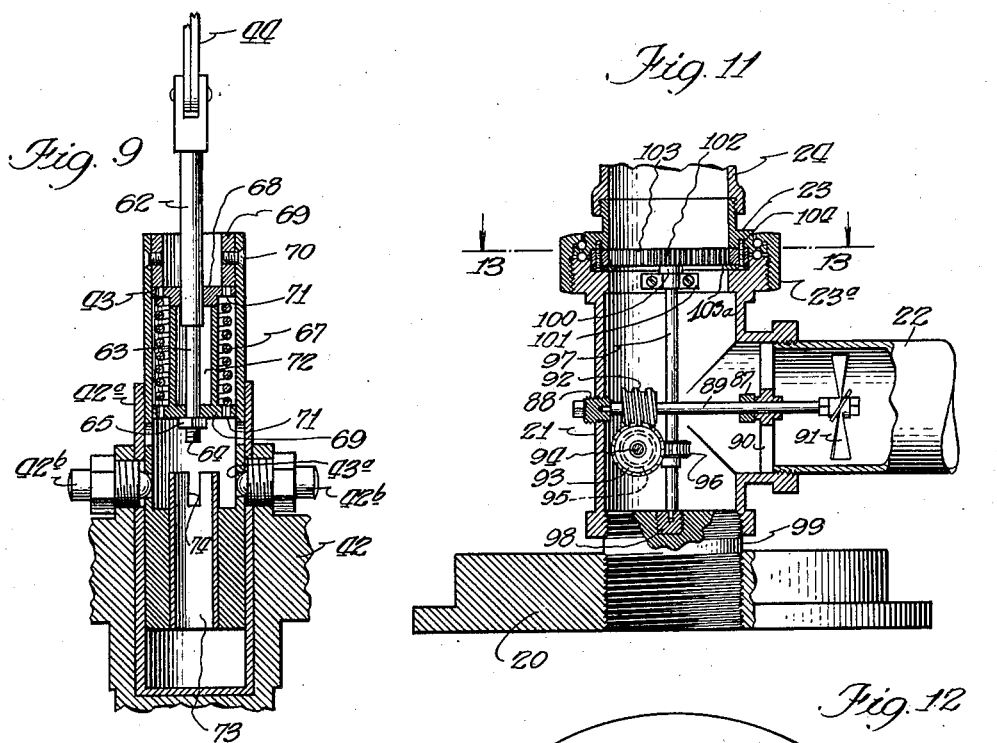
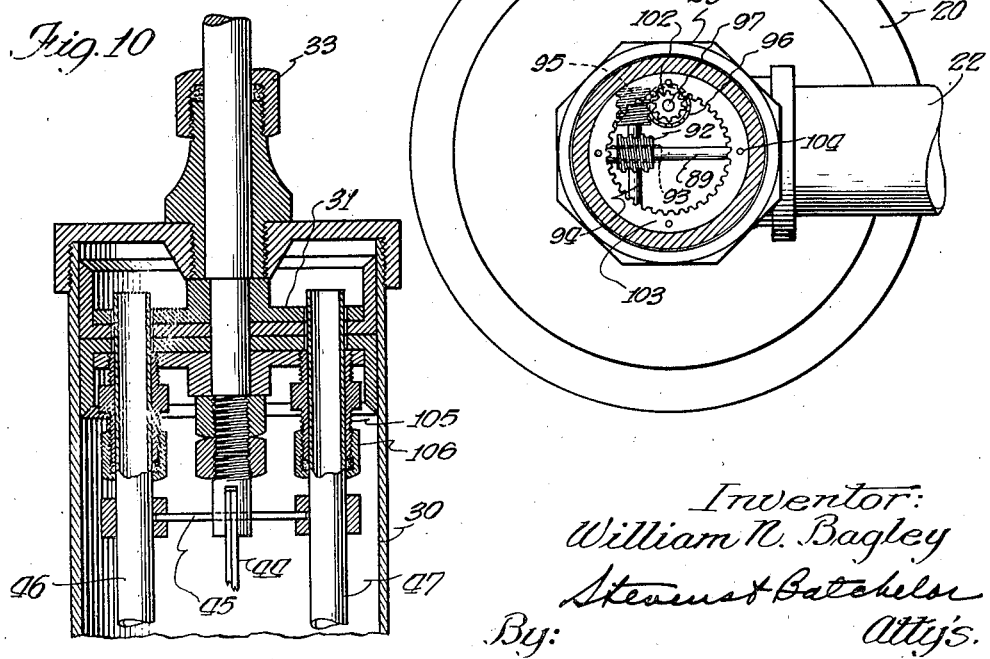

Patented June 22, 1943

2,322,271

UNITED STATES PATENT OFFICE 2,322,271

IRRIGATION SPRINKLER

William N. Bagley, Chicago, Ill.

Application September 23, 1940, Serial No. 358,005

8 Claims. (Cl. 299—66)

My invention relates to apparatus for the distribution of water over wide areas, such as in irrigation and sprinkling, and my main object is to provide a sprinkler of the rotary type with nozzles which undergo alternate outward and inward movements at a slow and variable rate, whereby to gradually and evenly cover the area of distribution.

A further object of the invention is to so control the motion of the sprinkler as to secure a relatively fast nozzle movement in the central zone for the disposing of a minimum amount of water during a given time, and a slower nozzle movement in the outer area in order to allow sufficient time to amply cover the same.

Another object of the invention is to design the novel sprinkler with hydraulic means to operate in the manner outlined.

An additional object of the invention is to construct the sprinkler as a machine of sufficient dimensions to handle relatively high water pressures, and with a construction comparable with fire extinguishing apparatus.

An important object of the invention is to employ a minimum of parts and proven mechanical principles in the sprinkler, whereby to render its cost economical and its operation dependable over a long period of use.

With the above objects in view and any others which may suggest themselves from the description to follow, a better understanding of the invention may be had by reference to the accompanying drawings, in which—

Fig. 1 is a front elevation of the sprinkler;

Fig. 2 is an enlarged and fragmental side view of the center portion of Fig. 1, partly in section;

Fig. 3 is an enlarged section on the line 3—3 of Fig. 1;

Fig. 4 is an enlarged section on the line 4—4 of Fig. 3;

Fig. 5 is a view similar to Fig. 4, showing certain parts in changed positions;

Fig. 6 is an enlarged section on the line 6—6 of Fig. 4;

Fig. 7 is a like section on the line 7—7 of Fig. 5;

Fig. 8 is a fragmental bottom view of a throttle strip shown in the lower part of Fig. 4;

Fig. 9 is an enlarged sectional view of the lower central part of Fig. 4;

Fig. 10 is an enlarged section of a piston structure in the upper portion of Fig. 4;

Fig. 11 is an enlarged sectional view of the bottom portion of Fig. 1; and

Fig. 12 is a section on the line 12—12 of Fig. 11.

Rotary sprinklers as generally marketed are limited in their area of distribution, and for this reason they must be moved from place to place in order to cover larger areas. Also, the uniform action of a rotary sprinkler has a tendency to flood or oversupply parts of the area within its limits if left in operation more than a given time; and the distribution is more or less in spots, so to speak, as the coverage is not uniform. It has therefore been my intention to devise a sprinkler which, while of a portable nature, is to all intents and purposes a machine which negotiates a wide area and applies its distribution uniformly.

In accordance with the foregoing, specific reference to the drawings indicates the base for the sprinkler at 20, the same preferably being a heavy circular plate from which a central vertical pipe 21 rises and has a lateral inlet 22 for the water supply hose or pipe, which is not shown. It is understood that the water will be supplied under standard pressure.

Since the sprinkler is of a rotary type, it extends from the center fitting 21 with a main pipe 23, a swivel fitting 23a being intermediately applied to enable the pipe 23 to rotate freely relative to the fitting 21. A more detailed view of the swivel joint is indicated in Fig. 11 and will be described in a later section.

The upper end of the pipe 23 receives a cross-fitting 24 from the sides of which extend pipes 25 continued with obtuse upward elbows 26 and divergent nipples 27 to extend with highly flexible hose sections 28 and terminal nozzles 29. The water branches directly into the parts just described to issue upwardly from the nozzles 29 as positioned according to full lines in Fig. 1 when the area in the center of the field or other course is to be sprinkled. Means are provided, however, to gradually separate or to deflect the nozzles 29 during the rotation of the sprinkler in order to widen the action of distribution, so that the nozzles finally assume the dotted line positions in Fig. 1.

It is my intention to slowly separate the nozzles as just mentioned and slowly return them to their original positions by continuous and automatic means, so that time will be allowed for the sprinkling to have effect while the outer areas are being sprinkled, and vice-versa. In order to impart the necessary motions to the nozzles, I employ a central vertical cylinder 30 in which a piston 31 is reciprocable, the rod 32 of the piston rising from the cylinder through suitable packing means 33 to carry a head 34 from which radius rods 35 extend to the respective nozzles.

Thus, full lines in Fig. 1 show that the piston rod 32 is at the upper end of its travel to position the nozzles vertically; and dotted lines indicate the positions of the parts when the piston rod has reached its lower limit.

The interior of the cylinder 30 is more clearly shown in Fig. 2, and it is my purpose to operate the piston 31 up and down by means of water entering the pipe 23 and automatically in a manner similar to a reciprocating engine. As indicated in Fig. 2, the cylinder 30 is applied to the upward branch 36 of the cross fitting 24 which receives the supply pipe 23, the branch having a thickened internal portion 37 to form a seat for the cylinder. The cylinder and branch are connected by being formed with angle flanges 38 and 39 which are clamped by bolts 40.

The portion 37 of the cross fitting 24 is tapped with a taper to tightly receive a bearing 42 for a cylindrical slide valve 43 which is intended to control the operation of the piston. As noted in Fig. 4, the valve is in the form of a cylinder which is vertically slidable in a cup 42a forming a lining for the bearing 42, the cup being herein considered as an integral part of, or as merged in the bearing; and in a general way the valve 43 is connected to the piston by a set of lazy-tongs 44. The connection is made through a cross head arrangement 45 carried by the piston rod on its under side and slidable along a pair of tubes 46 and 47 which rise into the cylinder from the bearing 42 on opposite sides of the lazy-tongs 44. The tubes communicate with the space above the piston, and it is my intention that a portion of the water entering the cross fitting from the pipe 23 shall rise through the bearing 42 and pass by way of the tube 47 into the space above the piston with sufficient pressure to force the latter down. Then, the valve 43 is intended to cut the tube 47 off from the pressure supply and allow the latter to rise through the bearing directly into the cylinder, whereby to impel the piston in the upward direction.

In order that the above operation of the piston may occur automatically, the valve 43 is made with a peculiar relation to the bearing 42 which is effective when the valve reaches the limits of a short reciprocatory stroke. Accordingly, the valve and the bearing are made with cooperative passages or ports which determine the direction of the water according to the above plan of operation.

Fig. 4 shows that the valve 43 is made with a pair of horizontal, adjoining passages 48 and 49 on one side and also with a pair of similar passages 50 and 51 a short distance below. These passages are intended to cooperate with a number of ducts in the bearing 42 which are all at one level. In a general sense, these ducts may all be considered as radially positioned, and the one initially involved is indicated at 52. The water in the cross fitting 37 communicates with the duct 52 by way of a vertical pipe 53 which rises from the interior of the cross fitting into the outer end of the duct 52 as clearly shown in Figs. 4 and 6. On the opposite side of the bearing a duct 54 occurs in diametrical alinement with the duct 52. As shown in Fig. 4, the outer end of the duct 54 communicates with an outward discharge pipe 55 extending from the side of the branch 36. A short duct 56 leads from the lower end of the tube 46 toward the valve 43, as does a similar duct 57 from the corresponding end of the tube 47. The bearing also has a pair of top surface cavities 58 and 59 which lead inwardly at the bottom with ducts 60 and 61. The passages 50 and 51 are curved or otherwise formed to bridge certain ducts in the bearing. Thus, Fig. 6 shows that when the valve 43 is at the upper end of its stroke the passage 50 makes communication between the ducts 60 and 54, while the passage 51 makes communication between the ducts 57 and 52. When the valve is moved to the bottom of its stroke, the passages 48 and 49 replace the passages 50 and 51 for bridging purposes. Thus, Fig. 7 shows that the passage 48 establishes communication between the ducts 56 and 54, while the passage 49 does the same between the ducts 61 and 52.

Tracing the passage of the water from the interior of the cross fitting 24 when the valve 43 is at the top of its stroke, it is seen that the water enters the inlet pipe 53 and, according to Figs. 6 and 4, passes through the passage 51 in the valve to rise into the pipe 47, it being assumed that the piston 31 is at the top of its stroke as shown. The water from the tube 47 will now enter the top of the cylinder and press on the piston to impel the same through a downward stroke. Assuming, also, that the space in the cylinder below the piston contains or is filled with water, the fall of the piston will cause the same to enter the cavity 58 and pass to the exterior as discharge water by way of the duct 60, passage 50, duct 54 and discharge pipe 55, relieving the piston of resistance in this connection. Now, when the piston has reached bottom, the valve 43 is caused to descend by means to be described in a later section. With the valve at the bottom of its stroke, the connections between the valve and its bearing change to the positions shown in Fig. 7. It is noted that the inlet pipe 53 now transfers water through the passage 49 into the cylinder, causing the piston to rise. The water above the piston is now forced into the tube 46 from whose bottom it passes through the passage 48, duct 54 and discharge pipe 55 to the exterior. It follows, of course, that the control means to be described will also act when the piston arrives at the top of its stroke to again raise the valve and reverse the action of the piston, so that the reciprocatory operation thereof becomes automatic. In addition, the action of the valve is made definite by forming the periphery thereof with two perforations 43a on each side spaced vertically according to the stroke of the valve. The bearing 42 rises with a wall 41 containing a spring-button 42b opposite each set of indentations. Thus, the valve snaps into place, so to speak, at each end of its stroke, fixing the latter. In order that the valve may not turn and prejudice the action just described, it is formed with a vertical slot 42c in one side, the slot receiving the tip 42d of a set screw 42e directed through the wall 41. The latter is preferably formed hexagonally as shown in Fig. 3 or of other angular contour for facility to receive a wrench when the bearing 42 is screwed down into the fitting branch 36.

In order that the operation of the piston be fully automatic, I cause it to induce the aforesaid action of the valve 43. Thus, when the piston arrives at the top of its stroke it draws up on the valve, and when the piston arrives at the lower end of its stroke it pushes the valve down. The parts incident to this operation require that the valve be made tubular, and they appear more clearly in Fig. 9. Thus, it is seen that the lazy-tongs 44 are linked at the bottom to a stem 62 which becomes reduced as a rod 63 whose lower end is threaded at 64 to receive a nut 65. Since the stem 62 is intended to be lowered into the valve to a considerable extent, the upper end of the valve is cut down with slots 66 on opposite sides to afford clearance for the lower links of the lazy-tongs 44 as they gather to the dotted line position of Fig. 2. It is intended that the valve be cushioned in either direction, in order that there may be no influence from the water pressure to lengthen or shorten the valve stroke or otherwise prejudice the regularity of the valve action. I therefore cause the motion to be transmitted through a compression spring 67 vertically placed within the valve. The spring exerts its tension between upper and lower circular plates 68 and 69 which are slidable in the valve, internal segments 69a being secured on opposite sides to the wall of the latter by screws 70 in order to form upward limits for the plate 68. Both plates are formed with circular series of perforations 71 in order that passage or relief may be afforded for any water which becomes trapped between the plates; and the plate 69 carries a column 72 which determines the extent to which the upper plate 68 may approach the lower plate 69.

As the segments 69a form an upward limit for the rise of the plate 68, a central tube 73 forms a bottom limit for the plate 69. The tube 73 is built solidly into the lower portion of the valve, but has its bottom open in order that water between the valve and the bottom of the bearing may rise to afford clearance to the descent of the valve. In addition, the tube 73 is slotted on opposite sides at the top as indicated at 74 for the egress of water which may be trapped therein, such as in the course indicated by arrows. It will now be seen that on the up stroke of the piston the same eventually pulls up on the stem 62, so that the nut 65 on the rod 63 will bear on the plate 69 and cause the spring 67 to be compressed until the spring-buttons 58 then in engagement with the valve yield to let the same respond to the pull and pass to the next point of engagement, as shown in Fig. 4. On the descent of the piston, the pressure is exerted on the plate 68 until it overcomes the resistance of the spring-buttons to the extent of pushing the valve down to the original point of engagement. The valve motion is thus induced through the spring intermediary, which is gentle, devoid of undue force and serves as a take-up for irregularities in the piston stroke, the spring-buttons only serving to hold the valve in place until the influence thereon overcomes the resistance of the spring 67. In this manner the valve is induced, independently of the water pressure on the piston to quickly and definitely move or "snap" to either end of its stroke, instead of lingering at intermediate points from the slow motion of the piston. Clearly, should the valve linger at a half-way point, neither of its passages would be in line with the water inlet or outlet, and the piston would stop.

Of the water rising from the main pipe 23 into the cross fitting 24 only a very small amount is employed to operate the piston 31 as described above, since the piston travel is very slow.

The cross fitting has lateral branches 75 for the passage of the water to nozzles 29. The feed to the latter is thus continuous and not checked or controlled in any way. As it is my intention to rotate the sprinkler as previously mentioned, it will be appreciated that the area sprinkled when the nozzles are closed to the center is much smaller than when they separate and travel in a gradually increasing circle. Consequently, in order not to flood the inner area when the nozzles gather, it is advisable to impart more speed to the gathering and spreading movements of the nozzles in the central area than in the outer one. This can be done by controlling the amount of water entering the cylinder 30 by way of the entrance pipe 53. Accordingly, I apply a throttle strip 76 slidably under the lower end of the pipe 53, as shown in Fig. 4, the strip having an opening 77 which tapers in an inward direction. In order that the strip may be held up against the pipe 53, the pendent portion 78 of the bearing 42 is tapped to receive a cap 79 from below, such cap containing a compression spring 80 which bears against the strip 76. The cap 79 is preferably conically pointed as indicated at 81 in order to reduce its resistance to the water rising into the cross fitting. Also, the bearing portion 78 is slotted on opposite sides as indicated at 82 to allow clearance for the passage of the strip 76.

The strip 76 is thus a throttle whose opening 77 controls the amount of water entering the pipe 53, and the sprinkler is designed to exercise this control automatically. Thus, Fig. 1 indicates that the outer end of the throttle strip 76 is enlarged at 76a to make a pivotal connection 83 with a lever 84 located in one of the sprinkler elbows 26 and hose sections 28. The lower end of the lever 84 is pivoted at 85 in the bottom of the elbow, while the upper end thereof is in the top part of the hose and formed with diverging branches 86 directed respectively to the inward and outward walls of the hose. It is therefore apparent that the movements of the members between the full line and dotted line positions will swing the lever 84 accordingly and operate the throttle strip 76 in a manner to increase the flow to the cylinder while the sprinkler arms are in the central zone. Preferably, the throttle when in the closed position still presents a small passage, in order that the piston may not come to a dead stop.

The rotation of the sprinkler is accomplished by the water pressure and means which are entirely internal. Thus, reference to Figs. 11 and 12 indicates that the supply pipe 22 and the center fitting 21 are formed with bearings 87 and 88 for a horizontal shaft 89, the bearing 87 being in the center of a spider 90 which permits the passage of the water from the pipe 22. In the latter, the shaft 89 receives a propeller blade 91 which is designed to rotate from the pressure of the water passing from the supply pipe 22 into the center fitting 21. In the latter, the shaft 89 carries a worm 92 which meshes on the under side with a gear 93 carried by a shaft 94 projecting from the wall of the center fitting. Near this wall, the shaft 94 carries a worm 95 which meshes with a horizontal gear 96 carried by a vertical shaft 97 located near the said wall of the fitting 21. The lower end of the shaft 97 rests in a bearing 98 carried by a plug 99 screwed into the center fitting from below and also into the base 20 to rigidly support the center fitting on the latter. The shaft 97 also receives a bearing 100 near its upper end, such bearing being suitably secured to the wall of the center fitting as indicated at 101. Above the bearing the shaft carries a spur pinion 102 which is in mesh with an internal gear 103 secured in the bottom of the swivel fitting 23a by screws 104 or other suitable means, the gear having a water seal facing 103a. It is therefore apparent that the propeller 91 transmits motion to the sprinkler through a speed reduction gearing which is stepped down to impart a slow rotary motion to the sprinkler.

Since the piston is slidable along the tubes 46 and 47, it must make a sufficient seal therewith to prevent leakage of water between the cylinder compartments separated by the piston. Fig. 10 shows that the lower end-plate of the piston receives a pair of nipples 105 through which the tubes 46 and 47 are slidable, the nipples receiving packing nuts 106 from below. Guide means for the lazy-tongs 44 are formed by the slidable crosshead 45.

It will be evident from the above description that I have provided a sprinkler which is a machine in every sense, larger than the conventional types, yet of compact construction. Further, the mechanism of the sprinkler is largely enclosed, so that it is protected from dust and dirt as well as from injury by or contact with external objects. Since the action of the main mechanism is very slow, the question of lubrication is not important as long as parts are used which minimize friction. In fact, with such parts made of bronze, stainless steel or other non-corridible metals or compositions made for water bearings, the very presence of the water will form a sufficient medium to relieve the working parts of friction. The factor of slow action also makes the sprinkler safe to approach or attend. Further, a sprinkler is had which not only accomplishes a wide distribution, but also controls the same to apply the water uniformly over the entire area, all without manual attention or adjustment of any kind. Finally, the novel sprinkler is constructed along sturdy lines and with parts and gearings which are of a character to withstand long usage without attention or repair.

While I have described the invention along specific lines, various minor changes and refinements may be made without departing from its principle, and I desire to consider all such changes and refinements as coming within the scope and spirit of the appended claims.

I claim:

1. A sprinkler comprising a rotatable center unit receiving a pressure water supply, a nozzle leading outwardly from the unit and forming a sprinkling delivery for a portion of said supply, a motor means operated by another portion of said water supply to impart a vertical oscillating movement to the nozzle relative to the unit so as to provide it with an inward and outward movement, and control means for said other water supply portion effective on the action of the motor to accelerate the inward movements of the nozzle and decelerate the outward movements thereof.

2. The structure of claim 1, said control means comprising a valve in said other supply portion, and means to increase the opening of the valve on said inward movements and decrease the same on said outward movements.

3. The structure of claim 1, said control means comprising a valve in said other supply portion, and means actuated by said nozzle to increase the opening of the valve on said inward movements and decrease the same on said outward movements.

4. The structure of claim 1, said control means comprising a valve in said other supply portion, and means within said nozzle and actuated by the same to increase the opening of the valve on said inward movements and decrease the same on said outward movements.

5. A sprinkler comprising a rotatable center fitting receiving a pressure water supply, a side branch from said fitting extending with a nozzle as a sprinkling delivery for a portion of said water supply, an upward column from said fitting housing a water motor, means operated by said motor to impart a vertical oscillating movement to the nozzle relative to the column to provide an instroke and an outstroke thereto, a water feed pipe depending from the motor into the fitting to receive another portion of said water supply to operate said motor, slide valve means serving as a variable closure for the pipe inlet, and a connection from the nozzle to said slide valve increasing admission to said inlet on the instrokes of the nozzle and decreasing admission to the same on the outstrokes thereof.

6. The structure of claim 5, the intermediate portion of said nozzle being flexible, and said connection comprising a lever extending lengthwise in said intermediate nozzle portion, the inner end of the lever being pivoted in the inner nozzle portion at a point distant from said pipe, and the slide valve being extended to make a connection with said lever at a point proximate to the inner end thereof.

7. A sprinkler comprising a rotatable center unit receiving a pressure water supply, a nozzle leading outwardly from the unit and forming a sprinkling delivery for a portion of said water supply, a column rising from said unit and forming the cylinder of a reciprocating water motor, a piston disposed for travel in the upper part of the cylinder, a connection from the piston through the top of the cylinder to said nozzle to impart a vertical oscillating movement to the nozzle as the piston reciprocates, means receiving another portion of said water supply for alternate application to the ends of the motor piston, slide valve means in the lower portion of the cylinder and serving as a control for said means, and a motive connection between the piston and the slide valve.

8. A sprinkler comprising a rotatable center unit receiving a pressure water supply, a nozzle leading outwardly from the unit and forming a sprinkling delivery for a portion of said water supply, a column rising from said unit and forming the cylinder of a reciprocating water motor, a piston disposed for travel in the upper part of the cylinder, a connection from the piston through the top of the cylinder to said nozzle to impart a vertical oscillating movement to the nozzle as the piston reciprocates, means within the cylinder receiving another portion of said water supply for alternate application to the ends of the motor piston, a slide valve in the lower portion of the cylinder and serving as a control for said means, and a motive connection between the piston and the slide valve.

WILLIAM N. BAGLEY.